(12) United States Patent
Giasson et al.

(10) Patent No.: US 9,669,338 B2
(45) Date of Patent: Jun. 6, 2017

(54) DISC FILTER AND A METHOD OF CONSTRUCTING A DISC FILTER SECTOR

(71) Applicant: GL&V Luxembourg S.à.r.l., Munsbach (LU)

(72) Inventors: Eric Giasson, Trois-Rivieres (CA);
Gregory Gilmore, Nashua, NH (US);
Karl Gabrielsson, Saltsjö-Boo (SE);
James P. Burns, Hollis, NH (US);
John O. Milliken, Nashua, NH (US)

(73) Assignee: GL & V Luxembourg Sàrl, Munsbach (LU)

( * ) Notice: Subject to any disclaimer, the term of this patent is extended or adjusted under 35 U.S.C. 154(b) by 82 days.

(21) Appl. No.: 14/645,064

(22) Filed: Mar. 11, 2015

(65) Prior Publication Data

US 2016/0263497 A1   Sep. 15, 2016

(51) Int. Cl.
  *B01D 33/23* (2006.01)
  *B01D 33/25* (2006.01)
  *B01D 33/80* (2006.01)
  *B01D 33/31* (2006.01)
  *B01D 33/21* (2006.01)

(52) U.S. Cl.
  CPC ............. *B01D 33/23* (2013.01); *B01D 33/21* (2013.01); *B01D 33/25* (2013.01); *B01D 33/803* (2013.01)

(58) Field of Classification Search
  CPC ........ B01D 29/54; B01D 33/21; B01D 33/23; B01D 33/0093; B01D 33/067; B01D 33/50; B01D 33/012
  See application file for complete search history.

(56) References Cited

U.S. PATENT DOCUMENTS

| 2,395,225 | A | * | 2/1946 | Kurz | B01D 33/23 210/359 |
| 2,964,194 | A | * | 12/1960 | Oliver, Jr. | B01D 33/23 210/331 |
| 3,291,312 | A | * | 12/1966 | Peterson | B01D 33/23 210/345 |
| 3,331,512 | A | * | 7/1967 | Vore | B01D 33/23 210/487 |
| 3,473,669 | A | * | 10/1969 | Davis | B01D 33/23 210/486 |
| 3,485,376 | A | * | 12/1969 | Peterson | B01D 33/23 210/331 |
| 3,539,050 | A | * | 11/1970 | Davis | B01D 33/23 210/486 |
| 3,692,181 | A | * | 9/1972 | Davis | B01D 33/23 210/331 |
| 3,837,499 | A | * | 9/1974 | Luthi | B01D 33/465 210/404 |
| 3,948,779 | A | * | 4/1976 | Jackson | B01D 33/23 210/331 |

(Continued)

FOREIGN PATENT DOCUMENTS

FI   CA 2070341 A1 * 12/1992 ............. B01D 33/23

*Primary Examiner* — Krishnan S Menon
*Assistant Examiner* — Waqaas Ali
(74) *Attorney, Agent, or Firm* — James Earl Lowe, Jr.

(57) ABSTRACT

A disc filter sector comprising a trapezium tubular support frame, and a trapezium screen frame supporting a screen cloth, the trapezium filter medium element being connected to the trapezium tubular support structure. More particularly, there is a pair of such filter sectors, and the sectors are connected together by an overlying cap.

6 Claims, 10 Drawing Sheets

(56) References Cited

U.S. PATENT DOCUMENTS

| | | | | |
|---|---|---|---|---|
| 4,159,951 | A * | 7/1979 | Davis | B01D 33/23 210/331 |
| 4,391,706 | A | 7/1983 | Steinkraus | |
| 4,578,192 | A * | 3/1986 | Muller | B01D 33/23 210/486 |
| 5,635,062 | A * | 6/1997 | Cameron | B01D 33/23 210/232 |
| 5,792,349 | A * | 8/1998 | Buettner | B01D 33/067 162/272 |
| 6,454,940 | B1 * | 9/2002 | Walters | B01D 29/413 210/232 |
| 7,285,180 | B2 * | 10/2007 | Sicley | D21F 1/78 162/357 |
| 7,293,659 | B2 * | 11/2007 | Grace | B01D 33/067 210/402 |
| 7,314,556 | B2 * | 1/2008 | Sheets | B01D 33/21 210/232 |
| 8,118,175 | B2 * | 2/2012 | Davis | B01D 33/0093 210/321.77 |
| 8,252,181 | B2 * | 8/2012 | Pitre | B01D 33/19 210/330 |
| 8,628,661 | B2 * | 1/2014 | Gaudfrin | B01D 33/23 210/232 |
| 8,801,929 | B2 * | 8/2014 | Davis | B01D 33/0093 210/331 |
| 2002/0153296 | A1 | 10/2002 | Servo et al. | |
| 2002/0185427 | A1 * | 12/2002 | Norell | B01D 24/22 210/263 |
| 2005/0078390 | A1 | 4/2005 | Gourde | |
| 2005/0121381 | A1 | 6/2005 | Sheets et al. | |
| 2007/0039869 | A1 * | 2/2007 | Lovizzaro | B01D 33/23 210/331 |
| 2010/0282659 | A1 | 11/2010 | Gaudfrin | |
| 2011/0024347 | A1 * | 2/2011 | Larsson | B01D 33/23 210/331 |
| 2012/0012519 | A1 * | 1/2012 | Altwies | B01D 29/012 210/489 |
| 2014/0197093 | A1 * | 7/2014 | Gabrielsson | B01D 35/28 210/485 |

\* cited by examiner

DISC FILTER AND A METHOD OF CONSTRUCTING A DISC FILTER SECTOR

BACKGROUND

The present invention relates to rotary filtering apparatus and more particularly to a disc filter and disc filter sectors.

Disc filters are used in the pulp and paper making industry for many purposes. For example, one existing disc filter is designed for processing paper machine white water into high quality filtrate while, at the same time, recovering the fibers. It is also designed for thickening low to medium freeness pulp, especially where high discharge consistency is required. A portion of one such disc filter is illustrated in FIG. 1.

Each disc is built up by typically 3 to 30 open-grid sectors connected to corresponding filtrate channels in the shaft, with space between each sector to allow for the pickup and discharge of thickened pulp. The open-grid sector design helps to eliminate the risk of pulp and debris accumulating inside the sector. This design also allows the fabric to be cleaned from both the outside and inside by a spray water jet passing through the open sector. This keeps the cloth cleaned longer, which improves effectiveness.

To minimize the time needed for cloth exchange during preventive maintenance, the disc filter includes a cassette concept that makes it possible to dismount and mount sectors quickly. The sectors are accessible from a platform through hood doors. As illustrated in FIG. 1, a web of radial arms receives and supports each individual sector, and connects the sectors together in a watertight fashion.

The disc filter is designed for both clockwise and counter-clockwise rotation. An oscillating nozzle cleans the filter cloth before the filtration procedure begins again.

Current sector design is relatively costly to manufacture, both from a material and an assembly standpoint. It would be advantageous to reduce both the amount of material and the amount of assembly time needed for the manufacture and repair of such disc sectors.

SUMMARY

Disclosed is a disc filter sector comprising a trapezium tubular support frame, and a trapezium screen frame supporting a screen cloth, the trapezium filter medium element being connected to the trapezium tubular support structure. More particularly, there is a pair of such filter sectors, and the sectors are connected together by an overlying cap.

Also disclosed is a method of assembling the pair of such filter sectors.

Figure 1:
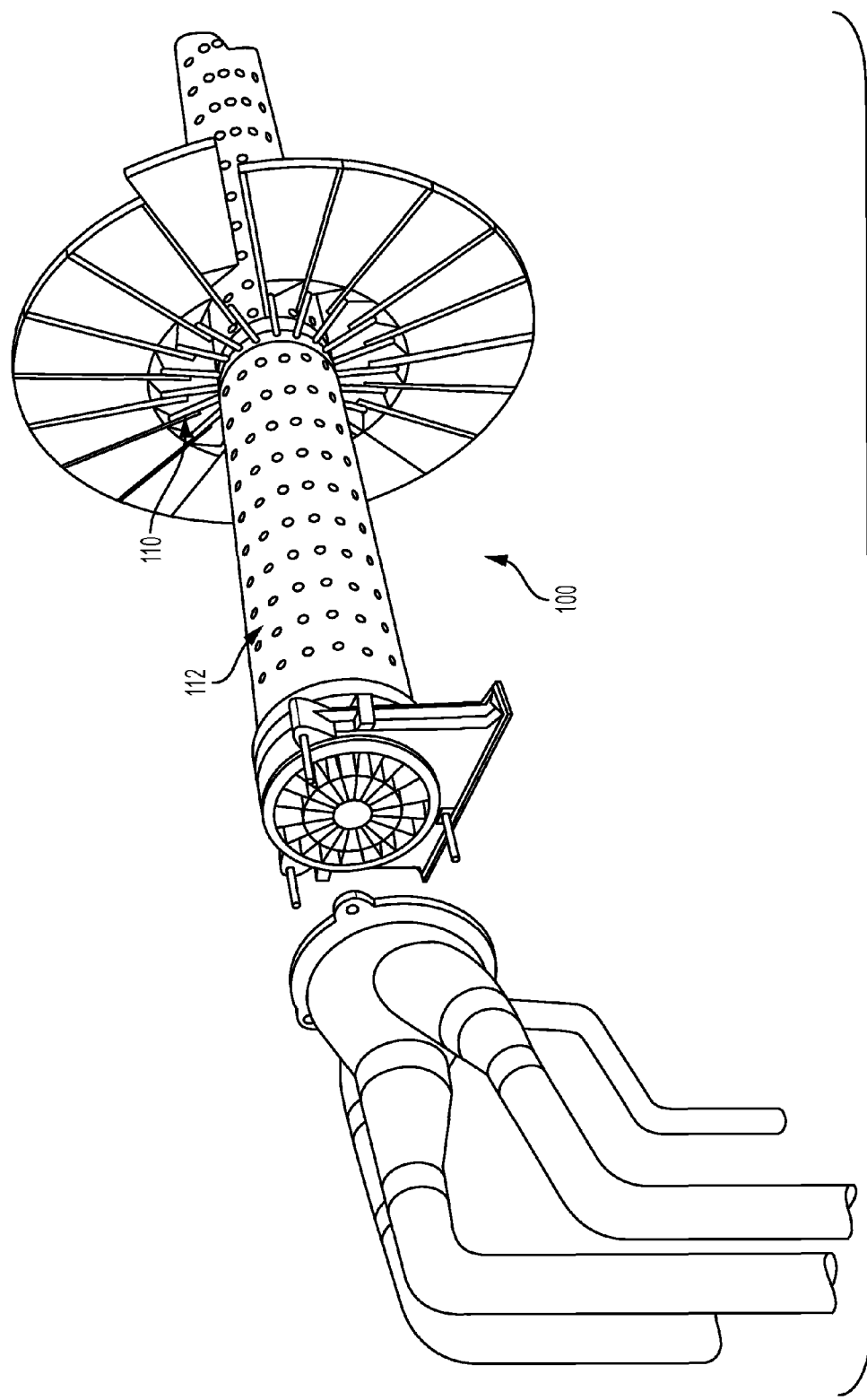
FIG. 1 is a perspective side view of a disk filter including a plurality of adjacent filter sectors.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward", "downward", "side", "top" and "bottom", etc., are words of convenience and are not to be construed as limiting terms.

DESCRIPTION OF THE EMBODIMENT

Figure 2:
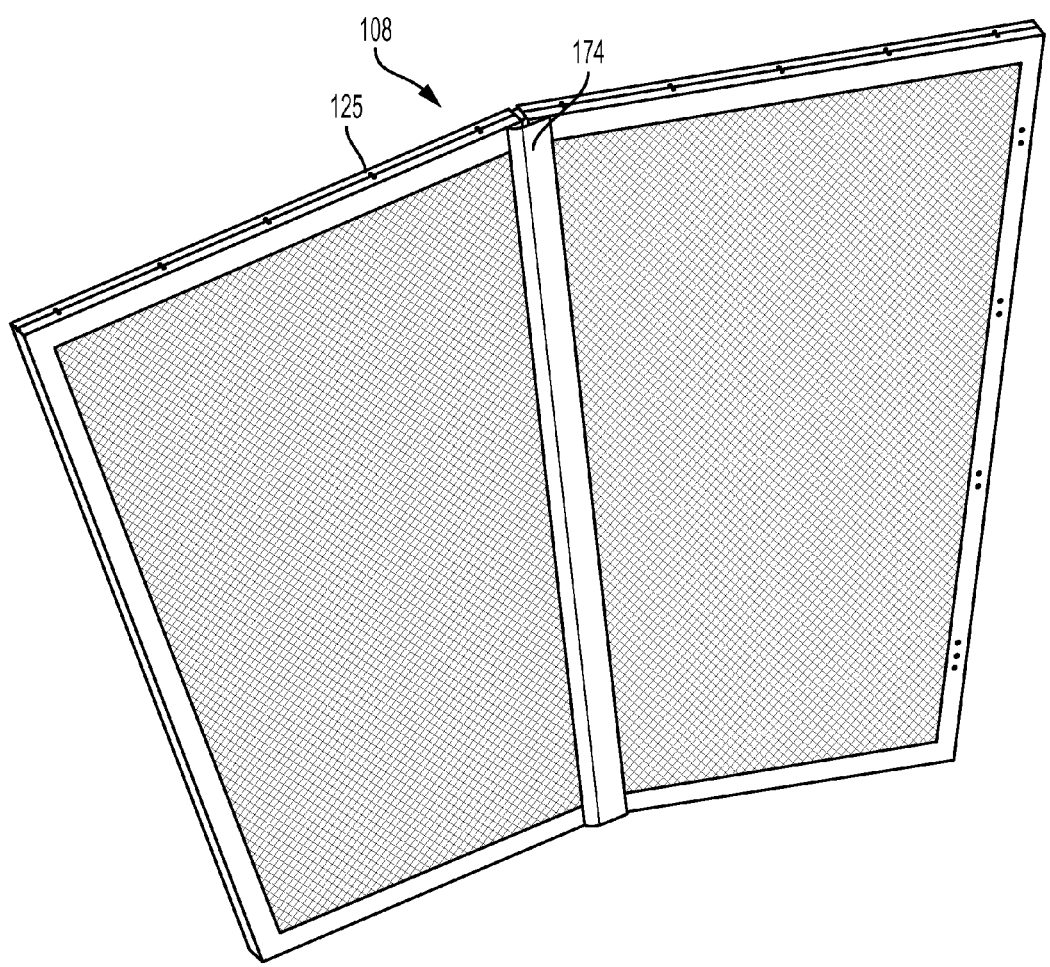
FIG. 2 is a perspective side view of two adjacent filter sectors according to this disclosure.

Illustrated in FIG. 1 is a disc filter 100 including at least two adjacent filter sectors 108. FIG. 2 illustrates two adjacent filter sectors according to this disclosure. A plurality of sets of such adjacent filter sectors 108 make up a disc filter like that illustrated in FIG. 1. Not illustrated in FIG. 2 are the sector funnel portions 110 (shown in FIG. 1) that fluidly connect an opening 113 (as shown in FIG. 3) in the bottom of the filter sectors 108 to the central shaft 112 of the disc filter 100 (as shown in FIG. 1).

Figure 3:
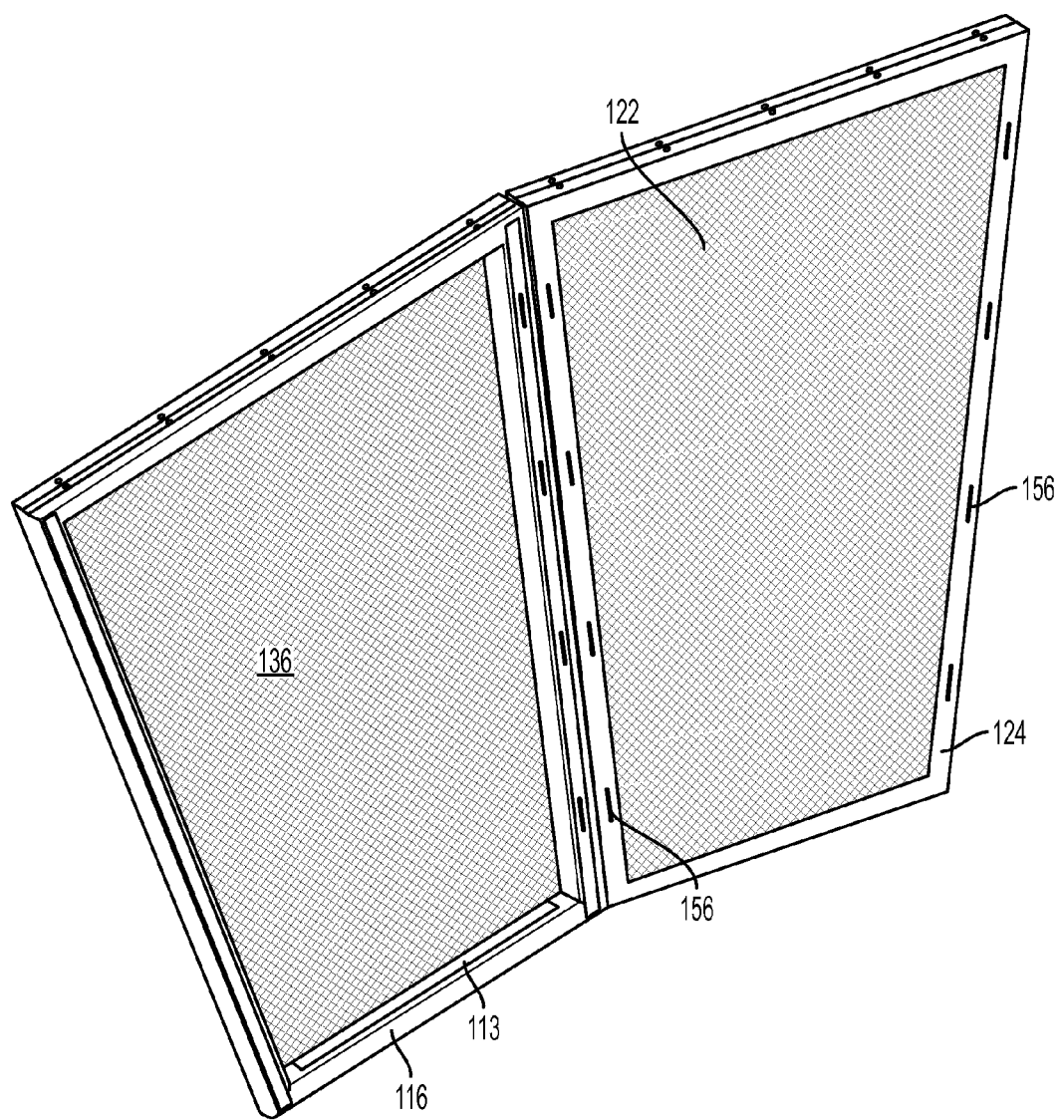
FIG. 3 is a perspective side view of the filter sectors of FIG. 2, only with one screen frame removed, and a cap for securing together the adjacent filter sectors removed.
Figure 6:
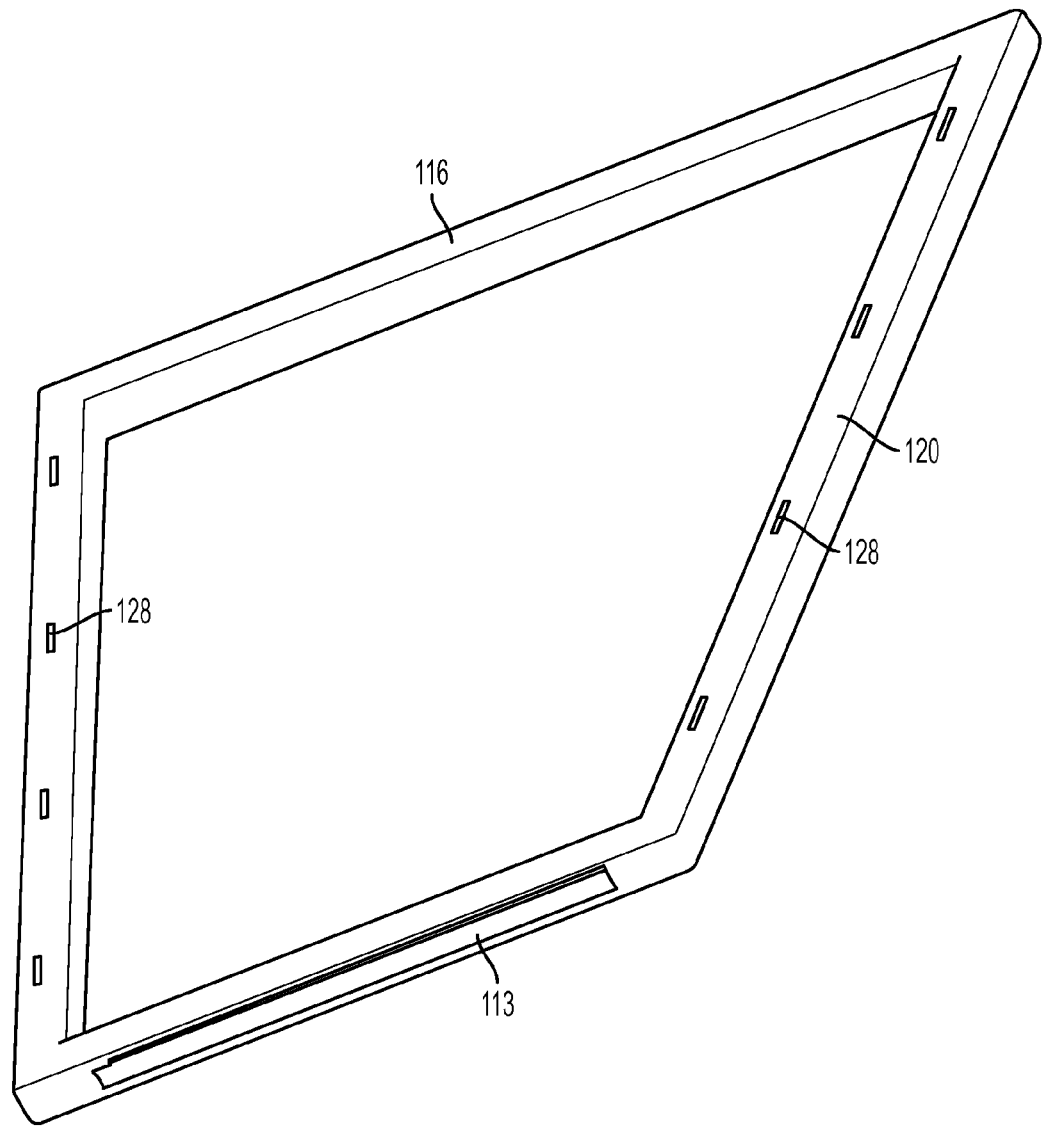
FIG. 6 is a bottom perspective view of the filter sector support structure.

Each filter sector 108 comprises a filter medium in the form of a screen cloth 122 (as shown in FIG. 3), a trapezium tubular support frame structure 116 having a filter medium support portion 120 (as shown in FIG. 6), a trapezium filter medium element in the form of a screen frame 124, the filter medium 122 being supported by the filter medium element 124, and means for connecting together the support structure 116, the filter medium element 124, and the two adjacent filter sectors 108, the connecting means comprising an overlying cap 174. In other embodiments (not shown), the support structure 116 can have as few as 3 sides or 5 or more sides. When other shaped support structure is used, the filter medium element will also be shaped so the filter element covers the open area of the support structure.

More particularly, the overlying cap having a filter medium element end-overlying portion 133, the overlying portion including a plurality of tabs 181 (see FIGS. 9 and 10) spaced apart along the longitudinal axis of the overlying portion 133. Each tab 181 has a first portion 183 that, when the disc filter is assembled, extends perpendicular to the support portion 120, and a second portion 185 angled relative to the first portion 183 and extending parallel to the longitudinal axis of the cap 174. Further, the support portion 120 has tab receiving openings 128 spaced apart along the longitudinal axis of the support portions 120 on each of the two sides of the support structure 116, and a filter medium element end 140 is placed on the support portion 120.

Figure 7:
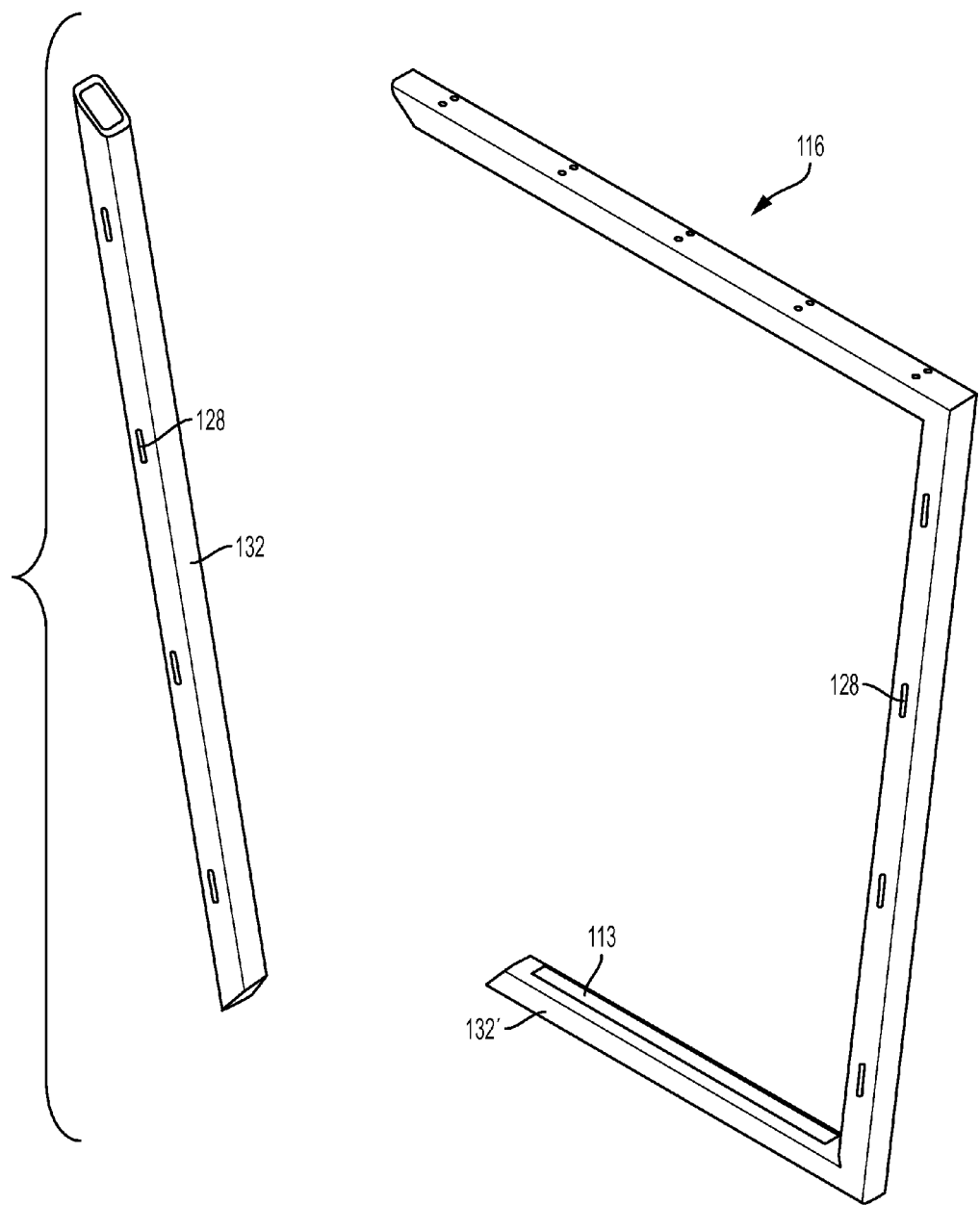
FIG. 7 is a partially exploded side view of the support structure.

More particularly, as illustrated in FIG. 7, the support structure 116 is formed from four hollow tubes 132 connected together by welding, screws, or other appropriate means (not shown). The bottom tube 132' has the fluid exit opening 113 passing through it. The support structure 116 has a filtrate compartment 136 that communicates with openings in the filter medium or screen for receiving liquid drained through the latter. The trapezium filter medium element 124 also has the end 140 mountable to the support structure support portion 120 by the overlying cap 174, as further described below. Although in the illustrated embodiment the support structure defines an open multisided enclosed structure with an open filtrate compartment 136 for communication with the openings in the filter medium, in other embodiments (not shown), one or more slats may extend across the opening, from adjacent side to side or opposite sides of the structure, in order to provide further structural support for the filter screen. And in other embodiments (not shown), a grid structure can be placed in the open filtrate compartment to support the filter screen against the inward pressure present as a result of the vacuum pull on the screen.

Figure 4:
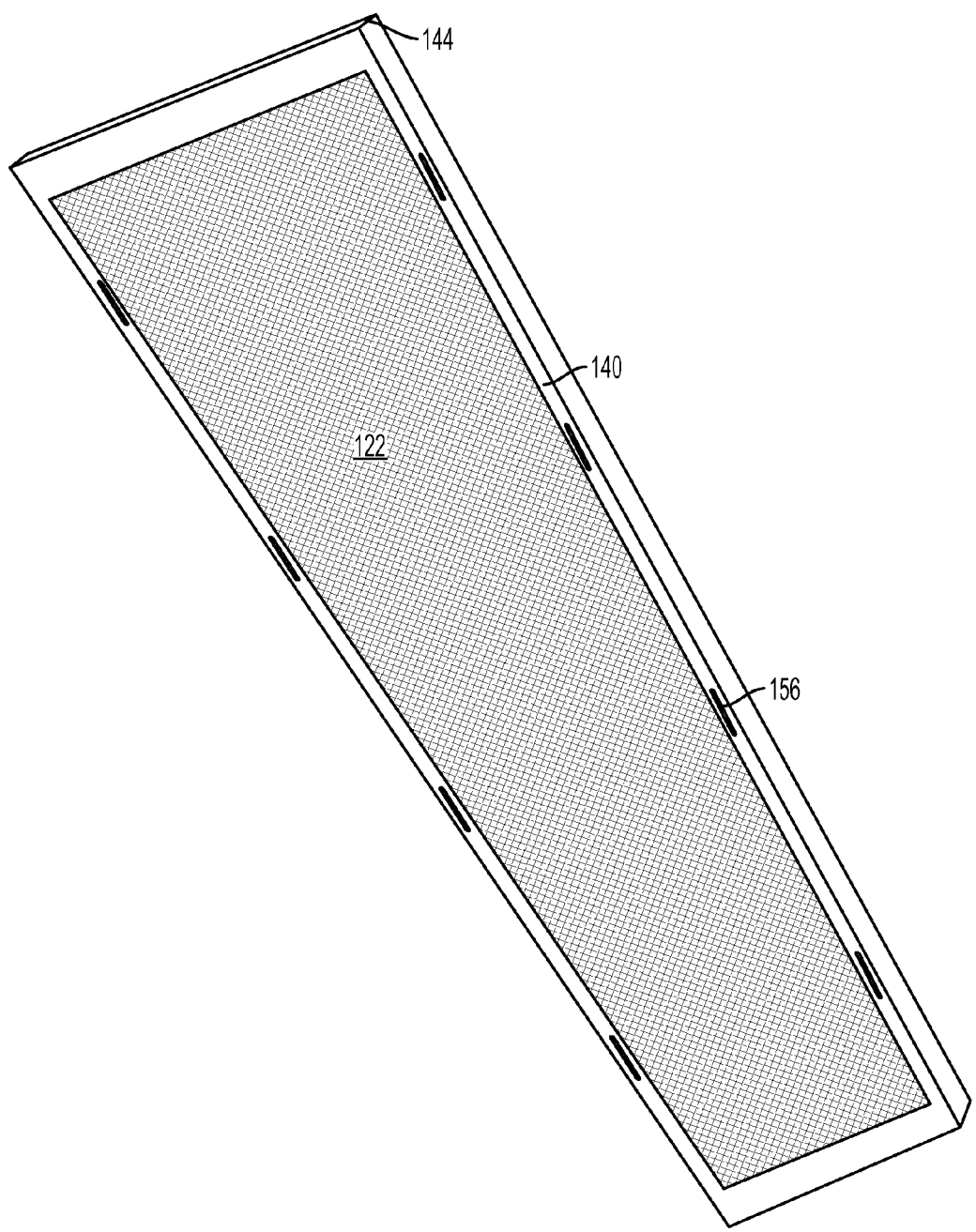
FIG. 4 is a perspective front view of the screen frame.
Figure 5:
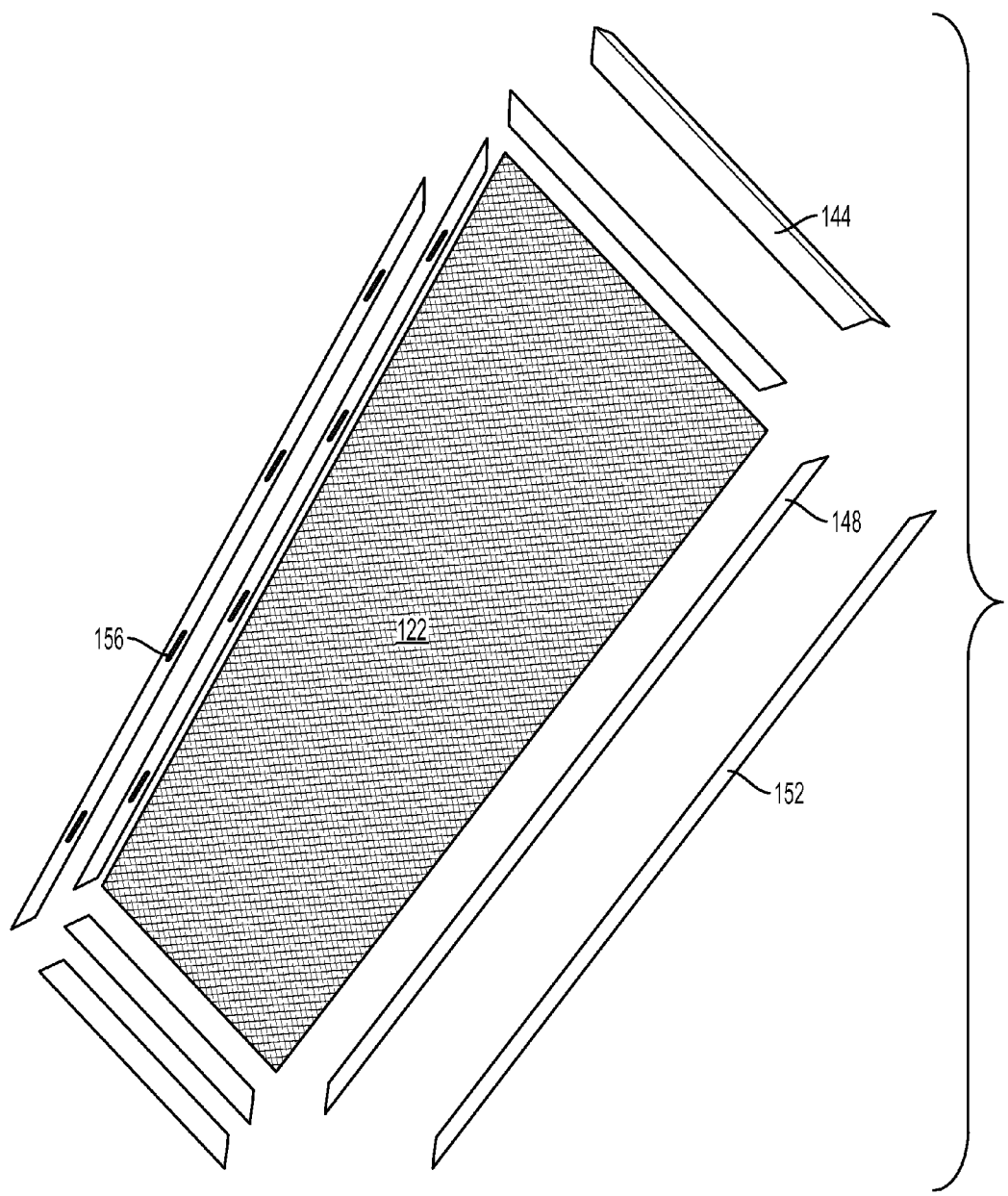
FIG. 5 is an exploded view of the screen and screen frame.

FIGS. 4 and 5 illustrate the filter medium element or screen frame 124. As shown in FIGS. 2 and 3, the screen frame 124 includes an upper right angle flange 144 for attaching the screen frame 124 by screws 125 or other suitable means to the screen frame support structure 116. The filter medium or screen 122 is supported on all of its outside edges by the filter medium element 124. On each edge, there is an elongated front piece 148 and an elongated back piece 152, all of the pieces being connected together, such as by screws (not shown), to form the screen frame 124.

The filter medium front piece 148, which forms the end 140 of the element 124, has a plurality of spaced apart openings 156 therein which each receive a respective one of a plurality of spaced apart cap tabs 181, as further explained below.

FIGS. 6 and 7 illustrate the filter sector support structure or frame 116. The support portion 120 of the support structure 116 has a plurality of tab receiving openings 128 (see FIG. 6) spaced apart along the longitudinal axis of the support portions 120, the openings 128 corresponding to the locations of the cap tabs 181 and the openings 156 in the filter medium element 124.

Figure 8:
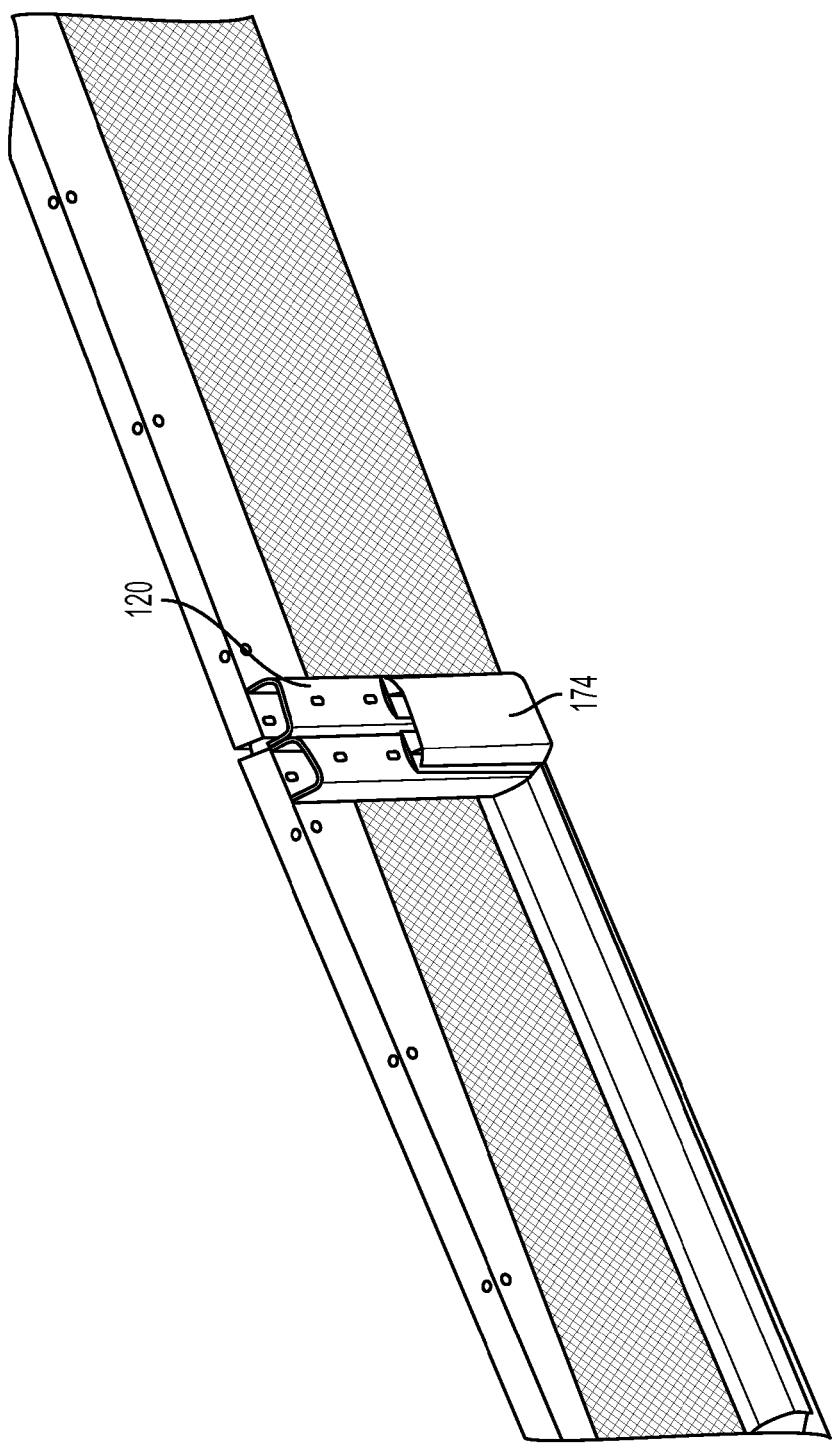
FIG. 8 is a partial cross section of part of the two adjacent filter sectors with the assembled cap.
Figure 9:
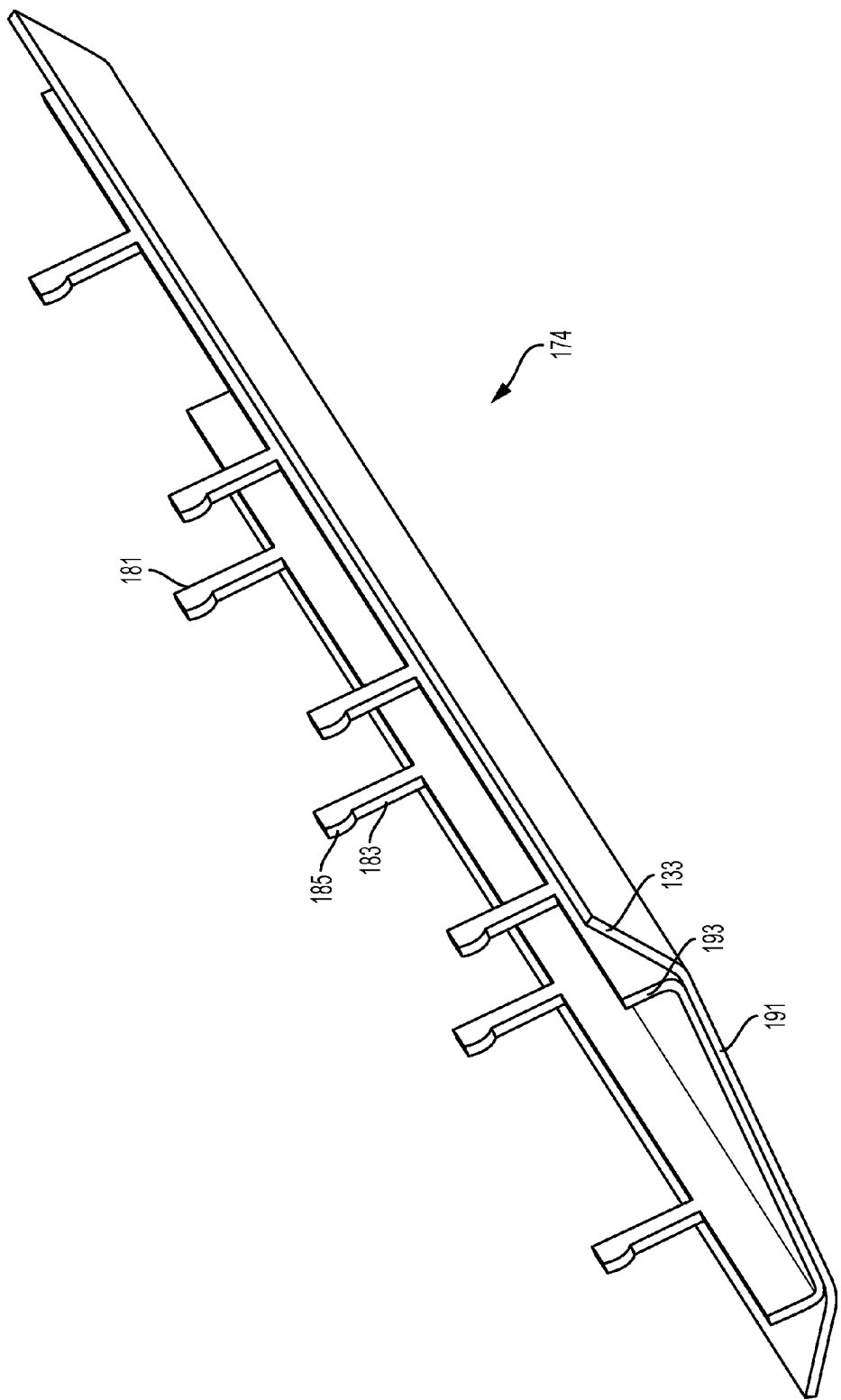
FIG. 9 is an end perspective view of the cap used to secure the filter sectors together.
Figure 10:
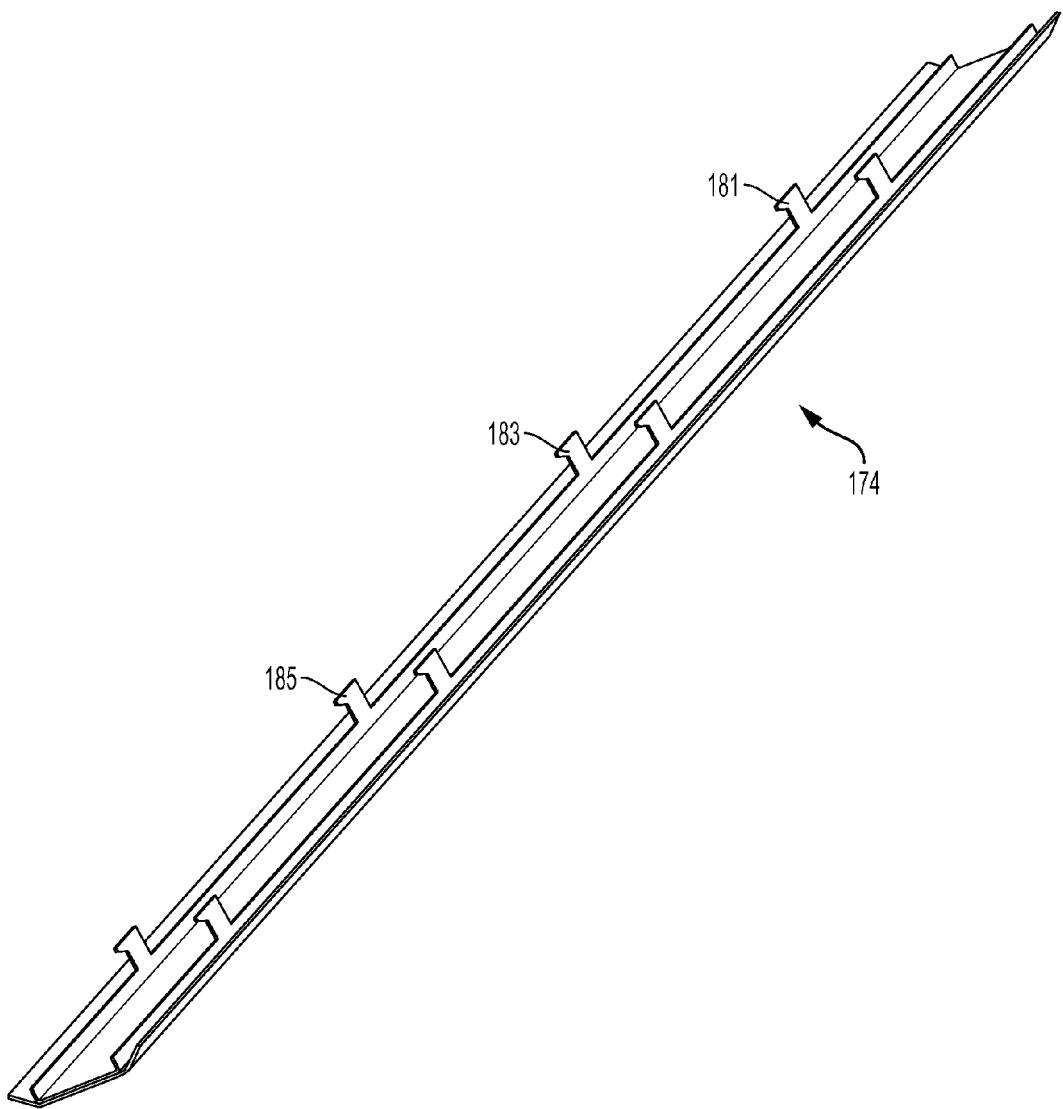
FIG. 10 is a side perspective view of the cap of FIG. 9.

FIGS. 9 and 10 illustrate the cap 174 used to secure the filter sectors together. As illustrated in FIG. 8, which is a partial cross section of part of the two adjacent filter sectors 108 with the assembled cap 174, each cap 174 has opposite extending first and second cover element edge-overlying portions, 177 and 179, respectively, each overlying portion including a plurality of tabs 181 spaced apart along the longitudinal axis of the overlying portion. More particularly, the cap 174 is formed from a first piece 191 with the overlying portions that are over and hold its respective cover element end. The cap 174 is also formed from a second U-shaped piece 193, with the plurality of spaced apart tabs 181 depending from the side walls of the U-shaped piece, the second piece 193 being secured, such as by welding, gluing or other appropriate means, to the first piece 191. In other less preferred embodiments, the cap can be formed from a single piece (not shown). Each cap tab 181 has a first portion 183 that, when the adjacent filter sectors are assembled, extends perpendicular to the respective support portion, and a second portion 185 angled relative to the first tab portion 183 and extending parallel to the longitudinal axis of the cap 174.

In the illustrated embodiment, the cap 174 extends over the edges of two adjacent filter sectors 108. In other embodiments (not shown), a cap could secure just the edge of a single filter sector. In this instance, the disclosed cap would be made from two side-by-side pieces, each with tabs 181, as opposed to the illustrated one-piece construction.

The filter sector is assembled by placing the filter medium element end 140 on the support portion 120, placing an overlying portion over the filter medium element end and inserting each respective tab 181 into a respective opening 156 in the filter medium element end 140, and a respective opening 128 in the support portion 120, and then moving the cap 174 along the support portion 120, so that the tab second portion 185 is then under the support portion 120, thus holding the cap 174 on the support structure 116, with the filter medium element end 140 trapped in between.

When an assembler moves the overlying portion along the support portion, the tab second portion engages the support portion, pulling the tab first portion through the tab-receiving opening, so that the overlying portion is pulled tighter against the element ends. The tab second portion is then under the support portion, thus holding the cap on the support structure, with the cover element ends trapped in between.

In other embodiments (not shown), no filter medium element openings need to be used. Instead, the tabs can extend past beyond the filter medium element ends, with the filter medium end trapped between the cap overlying portion and the support portion.

More particularly, for assembly, the adjacent ends of two elements are placed on the support structure, the support structures having two coplanar support portions of the adjacent filter sectors, extending in opposite directions, each support portion supporting a respective one of the adjacent element ends. And the cap has the two coplanar overlying portions, each of which is placed over a respective element end. Each of the overlying portions extend at an angle towards the element end relative to the support portions that holds the element ends. Thus, both ends of two adjacent filter medium elements are locked in place with the assembly of one cap. To complete the assembly, the cap is then locked in place, such as by screws (not shown) or other appropriate means to fasten the cap to the underlying support structure.

The disc filter so assembled then has a number of advantages over a conventional disc filter construction. It is no longer necessary to have the filter sector element ends welded to a supporting portion. This reduces the cost of the filter sectors.

In addition, the disclosed filter sectors do not need to be assembled by skilled assemblers. Now, with the adjacent filter sectors according to this disclosure, the assembler only needs to place the cap tabs inside the tab openings, and then slide the cap along the support structure. This makes the assembly process much simpler.

It is now also more convenient, in the disc filter according to this disclosure, for filter sectors to be replaced in the field. The removal of one filter sector from its adjacent filter sector is a much easier process.

Various other features of this disclosure are set forth in the following claims.

The invention claimed is:

1. A planar disc filter including two filter sectors adjacent to each other at their sides, and coplanar with the disc filter, each filter sector comprising a tubular support frame structure forming at least one of the sides of the adjacent sides of the filter sector, and a screen cloth supported by a filter medium element that covers an open area of the tubular support frame structure, and means for connecting together the tubular support frame structure, the filter medium elements, and the two adjacent filter sectors, the connecting means being an overlying cap extending along and attached to the adjacent sides of the adjacent filter sectors.

2. A disc filter according to claim 1 wherein the tubular support frame structure is a trapezium.

3. A planar disc filter including two filter sectors adjacent to each other at their sides, and coplanar with the disc filter, each filter sector comprising a filter medium, a support structure, the support structure having filtrate compartments communicating with openings in the filter medium for receiving liquid drained through the latter, an overlying cap having a longitudinal axis, a filter medium element having an end mountable to the support structure by the overlying cap, the support structure having a filter medium element end support portion, at least one of the filter medium element end support portions of each filter section defining one of the filter sector adjacent sides, the filter medium being supported by the filter medium element, and means for connecting together the support structure, the filter medium element, and the two adjacent sides of the filter sectors, the connecting means being the overlying cap having two a filter medium element end overlying portions, each of which extends over a respective one of the sides of the two sides of the adjacent filter sectors, each filter medium element end overlying portion including a plurality of tabs spaced apart along a longitudinal axis of the filter medium element end overlying portion, each tab having a first portion that, when the disc filter is assembled, extends perpendicular to the filter medium element end support portion, and a second portion angled relative to the first portion and extending parallel to the longitudinal axis of the cap, the filter medium element end support portion having tab receiving openings spaced apart along a longitudinal axis of the support portions, the filter medium element end being placed on the support portion, the filter medium element end overlying portion being located over the filter medium element end, each respective tab being inserted into a respective opening in the support portion, the filter medium element end overlying portion being translated along the support portion, so that the tab second portion is under the support portion, thus holding the cap on the support structure, with the filter medium element end trapped in between.

4. A disc filter according to claim 2 wherein the filter medium element end has a plurality of spaced apart openings therein which each receive a respective one of the tabs.

5. A disc filter sector comprising a tubular support frame structure, a filter medium element supporting a screen cloth that covers the open area of the tubular support frame structure, the filter medium element being connected to the tubular support structure.

6. A disc filter according to claim 5 wherein the tubular support structure is a trapezium.

* * * * *